(12) United States Patent
Shivarudrappa et al.

(10) Patent No.: US 11,414,200 B2
(45) Date of Patent: Aug. 16, 2022

(54) FAN COWL SECUREMENT RETAINERS (71) Applicant: ROHR, INC., Chula Vista, CA (US)

(72) Inventors: Shashidhar Shivarudrappa, Bangalore (IN); Rohit Kumar Sharma, Hyderabad (IN)

(73) Assignee: Rohr, Inc., Chula Vista, CA (US)

( * ) Notice: Subject to any disclaimer, the term of this patent is extended or adjusted under 35 U.S.C. 154(b) by 147 days.

(21) Appl. No.: 16/444,684

(22) Filed: Jun. 18, 2019

(65) Prior Publication Data
US 2020/0339272 A1 Oct. 29, 2020

(30) Foreign Application Priority Data

Apr. 29, 2019 (IN) .............................. 201941017004

(51) Int. Cl.
*B64D 29/06* (2006.01)
*B64D 29/08* (2006.01)
*F02K 1/70* (2006.01)
*B64D 27/10* (2006.01)
*F02K 1/80* (2006.01)

(52) U.S. Cl.
CPC .............. *B64D 29/06* (2013.01); *B64D 27/10* (2013.01); *B64D 29/08* (2013.01); *F02K 1/70* (2013.01); *F02K 1/80* (2013.01)

(58) Field of Classification Search
CPC ..... F02K 1/80; F02K 1/60; F02K 1/62; F02K 1/605; F02K 1/625; F02K 1/70; F02K 1/72; F02K 1/766; B64D 29/06; B64D 29/08; F01D 25/24; F01D 25/243; F05D 2260/37

See application file for complete search history.

(56) References Cited

U.S. PATENT DOCUMENTS

| | | | |
|---|---|---|---|
| 3,063,114 A | 11/1962 | Perrochat | |
| 3,262,168 A | 7/1966 | Overhoff | |
| 3,612,401 A * | 10/1971 | Ellis | F02K 1/70 239/265.29 |
| 5,737,914 A | 4/1998 | Porte et al. | |
| 6,334,588 B1 | 1/2002 | Porte | |
| 6,340,135 B1 | 1/2002 | Barton | |
| 7,086,219 B2 | 8/2006 | Stretton et al. | |
| 7,334,393 B2 * | 2/2008 | Porte | B64C 7/02 60/226.1 |

(Continued)

FOREIGN PATENT DOCUMENTS

EP 1112931 7/2001

OTHER PUBLICATIONS

European Patent Office, European Search Report dated May 6, 2020 in Application No. 19216704.7.

(Continued)

*Primary Examiner* — Andrew H Nguyen
(74) *Attorney, Agent, or Firm* — Snell & Wilmer L.L.P.

(57) ABSTRACT

A nacelle may comprise an inlet and a fan cowl aft of the inlet. The fan cowl may include a fan cowl panel configured to rotate between an open position and a closed position. The nacelle may further comprise a securement retainer including a first portion coupled to an interior surface of the fan cowl panel and a second portion coupled to an aft inlet flange of the inlet. The first portion of the securement retainer may be configured to engage the second portion.

13 Claims, 7 Drawing Sheets

(56) References Cited

U.S. PATENT DOCUMENTS

| | | | | |
|---|---|---|---|---|
| 8,333,343 | B2* | 12/2012 | Bourdon | B64D 29/08 244/53 B |
| 9,573,695 | B2 | 2/2017 | Suciu et al. | |
| 10,077,669 | B2 | 9/2018 | Bifulco | |
| 10,087,781 | B2 | 10/2018 | Kioua et al. | |
| 2004/0255572 | A1* | 12/2004 | Porte | F02K 1/70 60/226.1 |
| 2005/0039438 | A1* | 2/2005 | Lair | F02K 1/763 60/226.2 |
| 2007/0278345 | A1 | 12/2007 | Oberle et al. | |
| 2010/0287910 | A1* | 11/2010 | Joret | B64D 29/06 60/226.2 |
| 2011/0014044 | A1* | 1/2011 | Vauchel | B64D 29/06 415/214.1 |
| 2011/0024994 | A1 | 2/2011 | Bunel | |
| 2011/0272533 | A1* | 11/2011 | Bourdon | B64D 29/08 244/53 B |
| 2012/0097260 | A1* | 4/2012 | Porte | B64D 29/06 137/15.1 |
| 2012/0097261 | A1* | 4/2012 | Porte | B64D 29/08 137/15.1 |

OTHER PUBLICATIONS

European Patent Office, European Office Action dated Nov. 16, 2021 in Application No. 19216704.7.

\* cited by examiner

FAN COWL SECUREMENT RETAINERS

CROSS REFERENCE TO RELATED APPLICATIONS

This application claims priority to and the benefit of India Patent Application No. 201941017004 filed Apr. 29, 2019 and entitled "FAN COWL SECUREMENT RETAINERS," which is incorporated by reference herein in its entirety for all purposes.

FIELD

The present disclosure relates to aircraft nacelles, and more particularly to securement retainers for nacelle fan cowls.

BACKGROUND

A nacelle for a turbine engine typically includes an inlet, a fan cowl, a thrust reverser, and an exhaust section. The nacelle is typically mounted to a wing or a fuselage of an aircraft via a pylon. The fan cowl is typically split into two hingedly coupled halves, which may be pivoted, or rotated, to an open position to access the turbine engine. During flight, a large pressure differential may be created between the interior and exterior of the nacelle. The increased pressure differential may generate a radially outward force at the interface between the fan cowl and the inlet. The radially outward force may create, or increase, a space or "gap" at the interface. An increased interface gap may allow exterior air to enter the interior of the nacelle, thereby increasing internal compartment pressure and/or stress (e.g., hoop stress) on the fan cowl.

SUMMARY

A nacelle is disclosed herein. In accordance with various embodiments, the nacelle may comprise an inlet and a fan cowl aft of the inlet. The fan cowl may include a fan cowl panel configured to rotate between an open position and a closed position. The nacelle may further comprise a first securement retainer including a first portion coupled to an interior surface of the fan cowl panel and a second portion coupled to an aft inlet flange of the inlet. The first portion of the first securement retainer may be configured to engage the second portion.

In various embodiments, the aft inlet flange may comprise a fan cowl interface portion configured to contact the interior surface of the fan cowl, and a retainer land radially inward of the fan cowl interface portion. The second portion of the first securement retainer may be coupled to the retainer land.

In various embodiments, the retainer land and the second portion of the first securement retainer may be located forward of the fan cowl interface portion. In various embodiments, the retainer land and the second portion of the first securement retainer may be located aft of the fan cowl interface portion.

In various embodiments, a thrust reverser may be aft of the fan cowl. A second securement retainer may include a receptacle coupled to the interior surface of the fan cowl panel and a stud coupled to a forward thrust reverser flange of the thrust reverser.

In various embodiments, the first portion of the first securement retainer may comprise a receptacle, and the second portion of the first securement retainer may comprise a stud. In various embodiments, the first portion of the first securement retainer may comprise a stud, and the second portion of the first securement retainer may comprise a receptacle.

In various embodiments, the first portion of the first securement retainer may extend from a first circumferential end of the fan cowl panel to a second circumferential end of the fan cowl panel opposite the first circumferential end.

In various embodiments, the nacelle may further comprise a second securement retainer including at least one of a receptacle or a stud coupled to the interior surface of the fan cowl panel. The first portion of the first securement retainer may be located proximate a first forward corner of the fan cowl panel, and the at least one of the receptacle or the stud of the second securement retainer may be located proximate a second forward corner of the fan cowl panel circumferentially opposite the first forward corner.

A propulsion system is also disclosed herein. In accordance with various embodiments, the propulsion system may comprise a gas turbine engine and a nacelle radially outward of the gas turbine engine. The nacelle may comprise an inlet and a fan cowl aft of the inlet. The fan cowl may include a fan cowl panel configured to rotate between an open position and a closed position. The nacelle may further comprise a first securement retainer including a first portion coupled to an interior surface of the fan cowl panel and a second portion coupled to an aft inlet flange of the inlet. The first portion may be configured to engage the second portion.

In various embodiments, the aft inlet flange may comprise a fan cowl interface portion configured to contact the interior surface of the fan cowl, and a retainer land radially inward of the fan cowl interface portion. The second portion of the first securement retainer may be coupled to the retainer land.

In various embodiments, at least one of the first portion of the first securement retainer or the second portion of the first securement retainer may comprise a receptacle defining a channel. In various embodiments, the receptacle may comprise a pair of legs. A proximal portion of the pair of legs may define a central portion of the channel. The central portion of the channel may comprise a varying axial width. In various embodiments, a distal portion of the pair of legs may define a mouth of the channel. The mouth of the channel may comprise a varying axial width.

In various embodiments, the first portion of the first securement retainer may extend from a first circumferential end of the fan cowl panel to a second circumferential end of the fan cowl panel opposite the first circumferential end.

In various embodiments, the nacelle may further comprise a second securement retainer including at least one of a receptacle or a stud coupled to the interior surface of the fan cowl panel. The first portion of the first securement retainer may be located proximate a first forward corner of the fan cowl panel, and the at least one of the receptacle or the stud of the second securement retainer may be located proximate a second forward corner of the fan cowl panel circumferentially opposite the first forward corner.

A securement retainer for a nacelle is also disclosed herein. In accordance with various embodiments, the securement retainer may comprise a receptacle and a stud. The receptacle may be configured to be coupled to a first component of the nacelle and may define a channel of varying width. The stud may be configured to be coupled to a second component of the nacelle. The receptacle may be configured to receive and engage the stud.

In various embodiments, the stud may comprise a head and a stem, a width of the head may vary such that the width of the head decreases between a widest point of the head and the stem and between the widest point of the head and a distal end of the head opposite the stem. In various embodiments, an axial width of the stem may be greater than an axial width of the receptacle at an elastic equilibrium of the receptacle.

In various embodiments, the first component of the nacelle may comprise a fan cowl and the second component of the nacelle may comprise a inlet.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to reference axes other than the engine central longitudinal axis.

Securement retainers, as described herein, may be located between the fan cowl and inlet of a nacelle. The securement retainers may be configured to prevent or reduce radially outward translation of the fan cowl. The securement retainers may block, or reduce, the flow of external air (i.e., air radially outward of the nacelle) from entering the fan cowl compartment, thereby reducing occurrences of pressure build-up within the fan cowl compartment. Current fan cowls are designed to withstand deformation and/or increased pressure build-ups within the fan cowl compartment. Reducing pressure build-up within the fan cowl compartment may allow for smaller and/or lighter weight fan cowls. In various embodiments, a securement retainer may be located between the fan cowl and the thrust reverser.

Figure 1A:
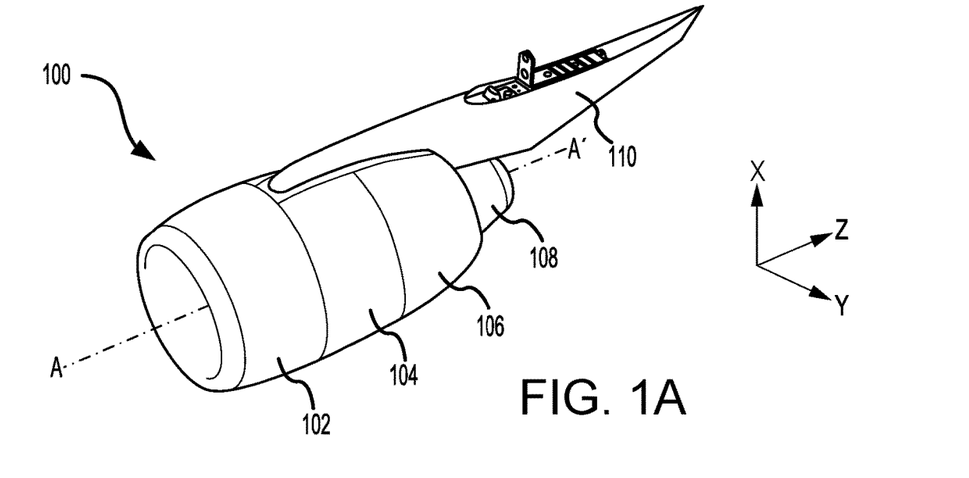
FIG. 1A illustrates a perspective view of a nacelle, in accordance with various embodiments.

Referring to FIG. 1A, a nacelle 100 for a propulsion system is illustrated, in accordance with various embodiments. Nacelle 100 may comprise an inlet 102, a fan cowl 104, a thrust reverser 106, and an exhaust system 108. Nacelle 100 may be coupled to a pylon 110. Pylon 110 may be configured to mount nacelle 100 and an engine surrounded by nacelle 100 to an aircraft wing or aircraft body.

Figure 1B:
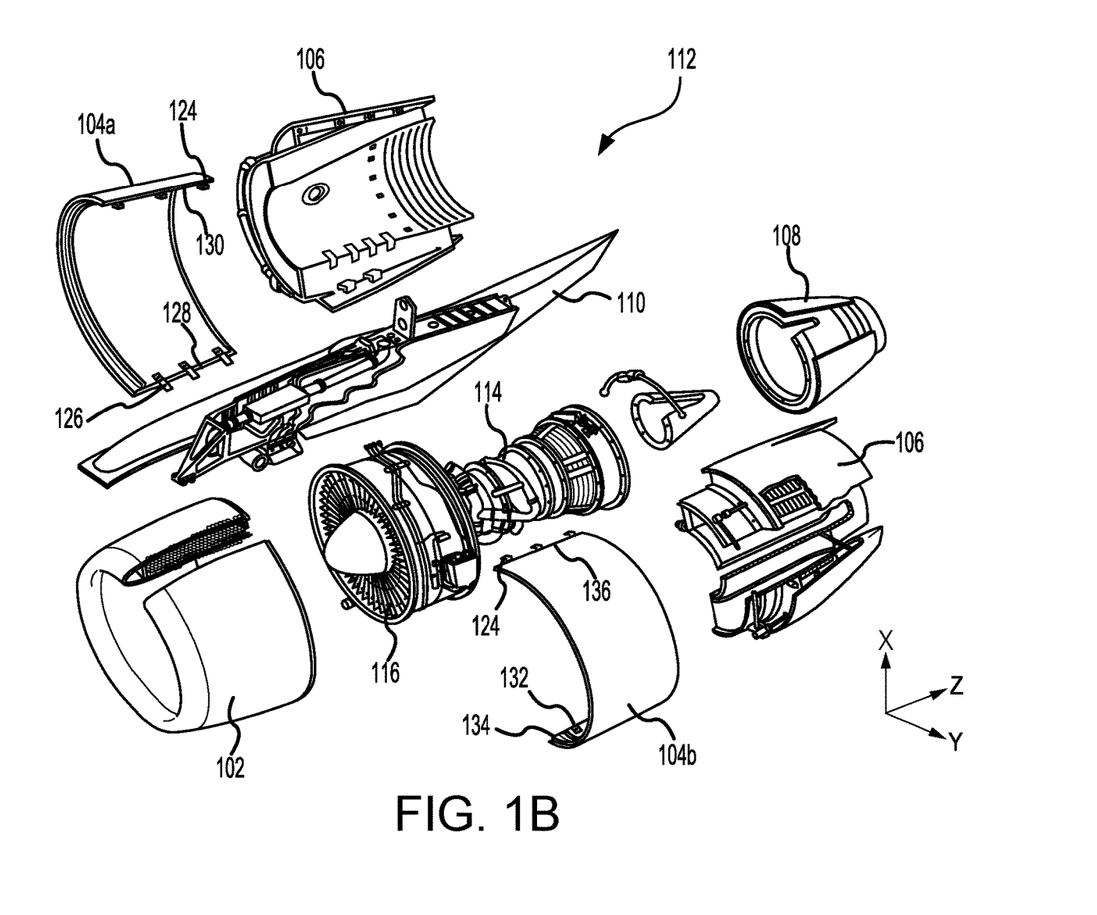
FIG. 1B illustrates an exploded view of a propulsion system, in accordance with various embodiments.

With reference to FIG. 1B, and continuing reference to FIG. 1A, an exploded view of a propulsion system 112 is illustrated, in accordance with various embodiments. In accordance with various embodiments, propulsion system 112 includes nacelle 100 and a gas turbine engine 114. Gas turbine engine 114 may be surrounded by components of nacelle 100. Nacelle 100 may provide smooth aerodynamic surfaces for airflow around and into gas turbine engine 114. Nacelle 100 may define at least a portion of one or more bypass air duct(s) through propulsion system 112.

In operation, a fan 116 of gas turbine engine 114 draws and directs a flow of air into and through propulsion system 112. The air may be divided into two principal flow paths: a core flow path through the core of gas turbine engine 114, and a bypass flow path through one or more bypass ducts outside of the core of gas turbine engine 114. The air in the core flow path may be directed through a compressor of gas turbine engine 114 that increases the air flow pressure and then through a combustor of gas turbine engine 114 where the air is mixed with fuel and ignited. The combustion of the fuel and air mixture is received by a series of turbine blades in a turbine section of gas turbine engine 114. The combustion gases cause the turbine blades to rotate and drive the rotors and fan 116 of gas turbine engine 114. The exhaust gases exiting the turbine section of gas turbine engine 114 may be directed through exhaust system 108. The air in the bypass flow path may be directed around the engine core through one or more bypass duct(s) defined, at least partially, by nacelle 100.

In accordance with various embodiments, fan cowl 104 may be split into a first fan cowl panel 104a and a second fan cowl panel 104b. First and second fan cowl panels 104a, 104b are configured to generally surround the fan 116 of gas turbine engine 114. First and second fan cowl panels 104a, 104b may be hingedly coupled to pylon 110 or to a stationary portion of fan cowl 104. Stated differently, first and second fan cowl panels 104a, 104b may each include one or more hinge joints 124. In this regard, first and second fan cowl panels 104a, 104b may be pivoted (or rotated), relative to pylon 110, to an open position to provide access to gas turbine engine 114.

In a closed position, first fan cowl panel 104a and second fan cowl panel 104b may be secured to one another, thereby preventing first and second fan cowl panels 104a, 104b from pivoting, or rotating, to the open position. For example, first fan cowl panel 104a may include one or more latches 126. Latches 126 are located circumferentially opposite hinge joints 124. In this regard, latches 126 are located at a first circumferential end 128 of first fan cowl panel 104a and hinge joints 124 are located at a second circumferential end 130 of first fan cowl panel 104a. First circumferential end 128 is circumferentially opposite, or approximately 180° from, second circumferential end 130. As used in the previous context, "approximately" means±40°. Latches 126 are configured to engage second fan cowl panel 104b and secure first fan cowl panel 104a to second fan cowl panel 104b. For example, each latch 126 may engage a latch hook 132 of second fan cowl panel 104b. Latch hooks 132 may be located circumferentially opposite hinge joints 124 of second fan cowl panel 104b. In this regard, latch hooks 132 are located at a first circumferential end 134 of second fan cowl panel 104b and hinge joints 124 are located at a second circumferential end 136 of second fan cowl panel 104b. While latches 126 are illustrated as included on first fan cowl panel 104a with latch hooks 132 included on second fan cowl panel 104b, it is further contemplated and understood that second fan cowl panel 104b may also include latches configured to engage latch hooks of first fan cowl panel 104a.

Figure 2A:
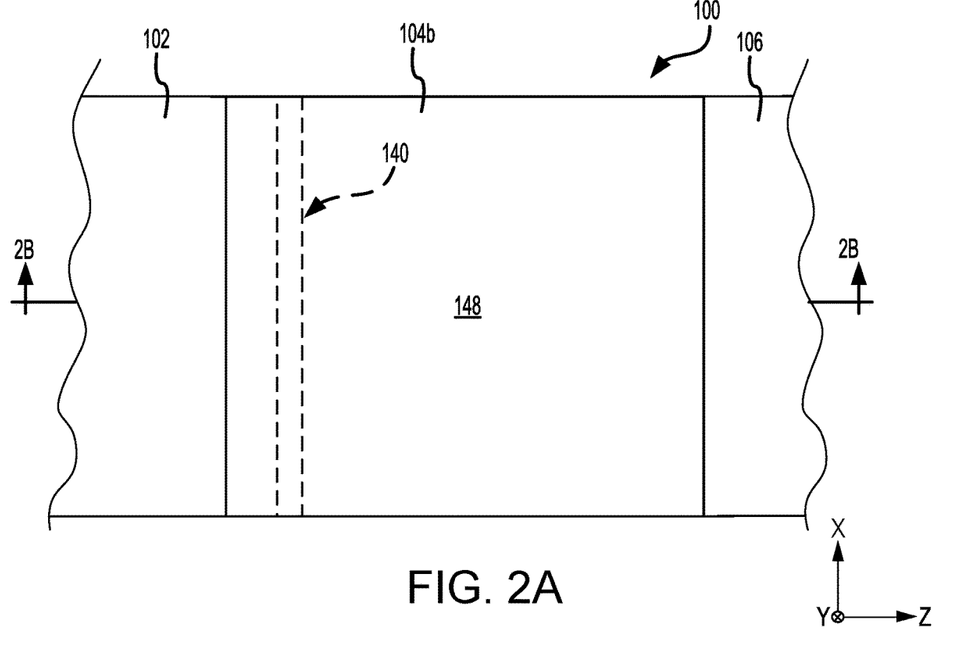
FIG. 2A illustrates a partial side view of a nacelle with a securement retainer coupled between the fan cowl and the inlet, in accordance with various embodiments.
Figure 2B:
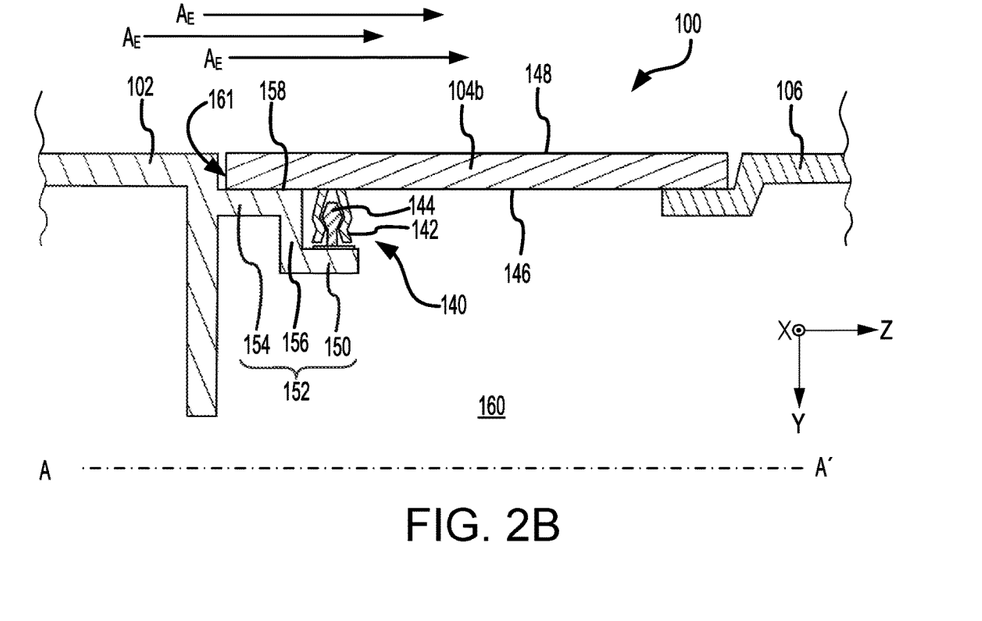
FIG. 2B illustrates a cross-section view of a nacelle with a securement retainer coupled between the fan cowl and the inlet taken along the line 2B-2B in FIG. 2A, in accordance with various embodiments.

Referring now to FIGS. 2A and 2B, and with continuing reference to FIG. 1B, in accordance with various embodiments, a securement retainer 140 may be coupled between second fan cowl panel 104b and inlet 102. While FIGS. 2A and 2B illustrate securement retainer 140 between second fan cowl panel 104b and inlet 102, it should be understood that a securement retainer including the elements and functionalities as described herein with respect to securement retainer 140 may also be located between first fan cowl panel 104a and inlet 102.

Securement retainer 140 includes a receptacle 142 and a stud 144. Receptacle (or first portion) 142 of securement retainer 140 is configured to receive and engage a stud (or second portion) 144 of securement retainer 140. In various embodiments, receptacle 142 may be coupled to an interior surface 146 of second fan cowl panel 104b. Receptacle 142 may be coupled by welding, an adhesive, a clip, a fastener, or any other suitable securement technique. In various embodiments, receptacle 142 may be integral with second fan cowl panel 104b. Interior surface 146 of second fan cowl panel 104b is opposite an exterior surface 148 of second fan cowl panel 104b. When fan cowl 104 is in the closed position, interior surface 146 is oriented radially inward (i.e., toward a central longitudinal axis A-A', with momentary reference to FIG. 1A, of nacelle 100) and exterior surface 148 is oriented radially outward (i.e., away from central longitudinal axis A-A'). Receptacle 142 extends radially inward from interior surface 146 of second fan cowl panel 104b. In various embodiments, receptacle 142 may be formed extending from first circumferential end 134 to second circumferential end 136 of second fan cowl panel 104b.

Stud 144 may be coupled to a retainer land 150 of inlet 102. Stud 144 may be coupled to retainer land 150 by welding, an adhesive, a clip, a fastener, or any other suitable securement technique. In various embodiments, stud 144 may be integral with retainer land 150. Retainer land 150 may comprise a radially inward portion of an aft inlet flange 152 of inlet 102. Aft inlet flange 152 may include retainer land 150, a fan cowl interface portion 154, and a connection portion 156 extending radially between fan cowl interface portion 154 and retainer land 150. Fan cowl interface portion 154 and retainer land 150 may extend in a generally axial direction. In various embodiments, retainer land 150 may be located aft of fan cowl interface portion 154. Connection portion 156 may extend in a generally radial direction. When fan cowl 104 is in the closed position with latches 126 engaging latch hooks 132, interior surface 146 of second fan cowl panel 104b may contact and/or apply a radially inward force against a radially outward surface 158 of fan cowl interface portion 154. Stud 144 of securement retainer 140 extends radially outward from retainer land 150. In various embodiments, stud 144 may be formed extending around a circumference of inlet 102. For example, stud 144 may extend between 320° and 360° about central longitudinal axis A-A'. While receptacle 142 and stud 144 are illustrated as coupled to second fan cowl panel 104b and aft inlet flange 152, respectively, it is further contemplated and understood that receptacle 142 may be coupled to aft inlet flange 152 and stud 144 may be coupled to second fan cowl panel 104b, similar to securement retainer 440 in FIG. 6.

Figure 4A:
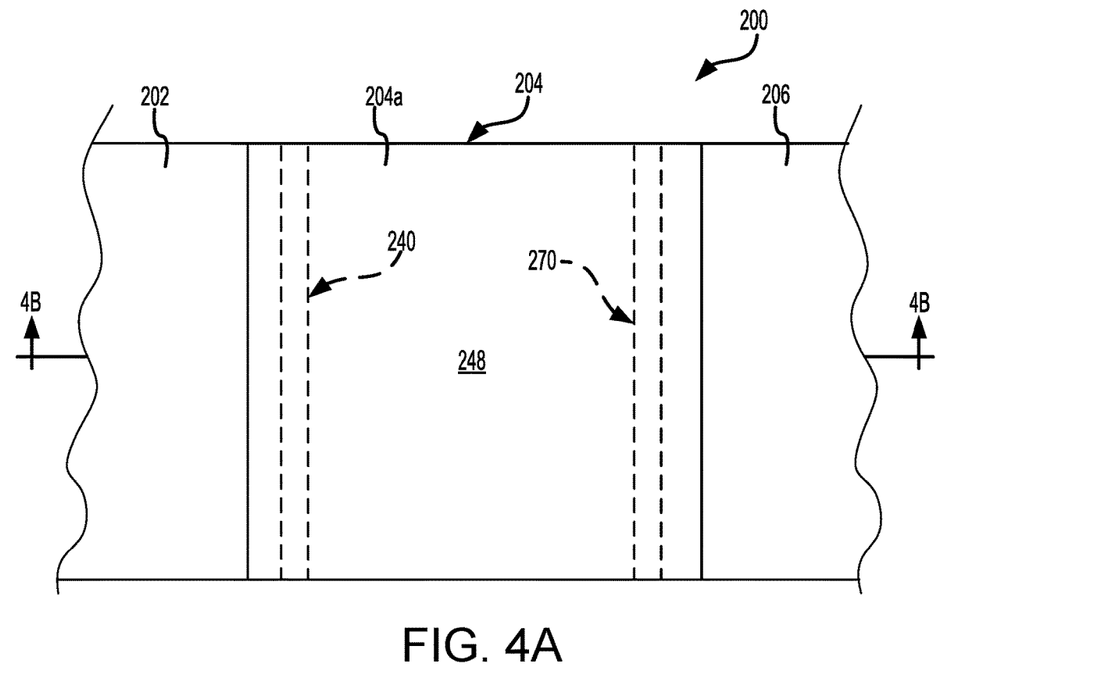
FIGS. 4A and 4B illustrate, respectively, a partial side view and a cross-section view, taken along the line 4B-4B in FIG. 4A, of a nacelle with securement retainers coupled between the fan cowl and the inlet and between the fan cowl and the thrust reverser, in accordance with various embodiments.

During flight, exterior airflow $A_E$ may flow between the interface between a forward edge 161 of second fan cowl panel 104b and the aft edge 162 of inlet 102, with momentary reference to FIG. 4A. If interior surface 146 of second fan cowl panel 104b separates from radially outward surface 158, exterior airflow $A_E$ may flow between interior surface 146 and radially outward surface 158 and generate a scooping phenomenon (e.g., apply a radially outward force against interior surface 146). Exterior airflow $A_E$ entering internal compartment 160 may also increase a pressure build-up within internal compartment 160. As described in further detail below, the engagement between receptacle 142 and stud 144 of securement retainer 140 may prevent or reduce radially outward translation of second fan cowl panel 104b, thereby helping to maintain a sealing interface between interior surface 146 and radially outward surface 158. Additionally, the engagement between receptacle 142 and stud 144 of securement retainer 140 may block or reduce external airflow $A_E$ from entering internal compartment 160 of nacelle 100 should a space develop between interior surface 146 and radially outward surface 158.

Figure 3A:
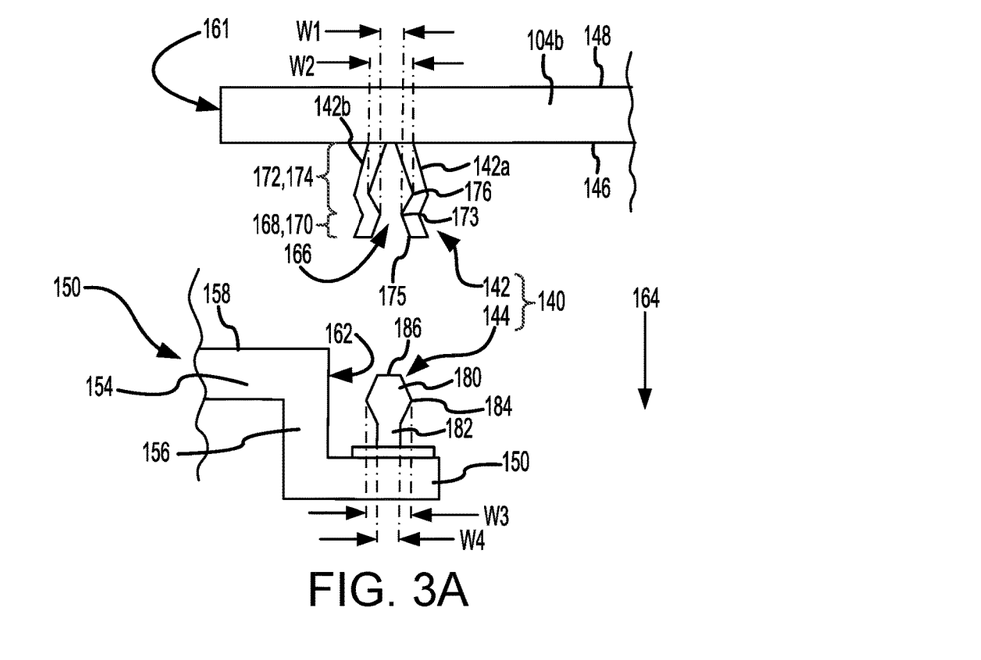
FIGS. 3A, 3B, and 3C illustrate translating a fan cowl to a closed position, thereby causing the engagement of a securement retainer between the fan cowl and an inlet, in accordance with various embodiments.
Figure 3B:
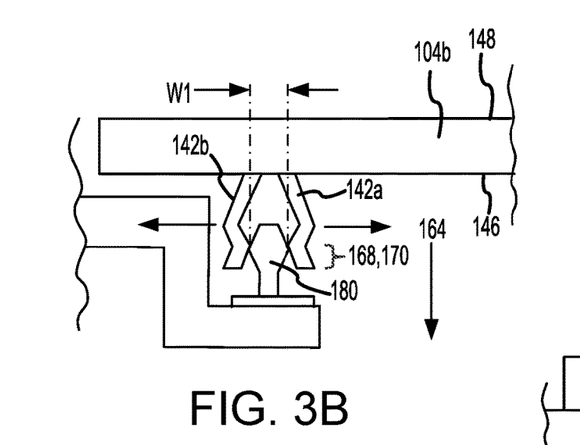
Figure 3C:
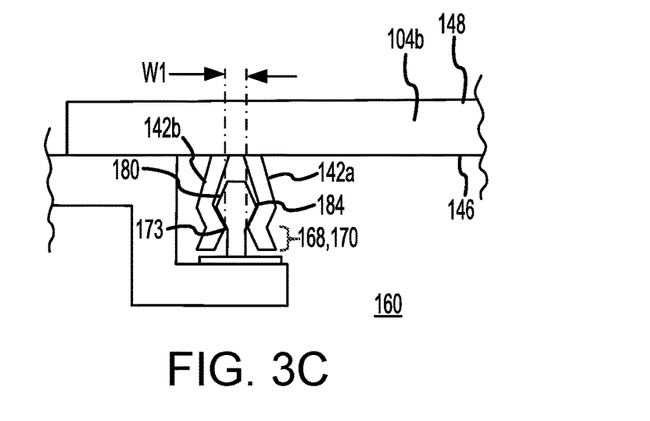

With reference to FIGS. 3A, 3B, and 3C, translation of second fan cowl panel 104b from an open position to a closed position is illustrated, in accordance with various embodiments. As second fan cowl panel 104b is closed (i.e., is moved in the radially inward direction of arrow 164), stud 144 is engaged by receptacle 142.

Referring to FIG. 3A, in various embodiments, receptacle 142 may include a pair of radially inward extending legs, referred to herein as first leg 142a and second leg 142b. First and second legs 142a, 142b may define a channel 166. To engage and reduce radially outward movement, the axial widths of channel 166 and stud 144 are varied in the radially direction. A distal portion 168 of first and second legs 142a, 142b defines a mouth 170 of channel 166. A proximal portion 172 of first and second legs 142a, 142b defines a central portion 174 of channel 166. Central portion 174 extends from mouth 170 to interior surface 146. An axial width of mouth 170 increases in the radially inward direction. Stated differently, mouth 170 includes a width W1 at its proximal or radially outward end 173; width W1 is less than the width of mouth 170 at its distal or radially inward end 175. Distal portions 168 of first and second legs 142a, 142b are non-parallel to a radial plane (i.e., to a plane normal to longitudinal axis A-A', with momentary reference to FIG. 1A).

Central portion 174 of channel 166 includes a width W2 at its axially widest point 176. Width W2 is greater than width W1. In this regard, the width of central portion 174 decreases in the radially inward direction between widest point 176 and proximal end 173 of mouth 170 and in the radially outward direction between widest point 176 and interior surface 146.

In various embodiments, stud 144 of securement retainer 140 includes a head 180 and a stem 182 extending radially inward from head 180. In various embodiments, head 180 may include a generally hexagonal shape. In various embodiments, head 180 may include a diamond, circular, oval, or any other shape. Head 180 of stud 144 includes a width W3 at its axially widest point 184. Width W3 is greater than a width W4 of stem 182. In this regard, the width of head 180 decreases in the radially inward direction between the widest point 184 and stem 182 and in the radially outward direction between widest point 184 and a distal end 186 of head 180 opposite stem 182.

Referring to FIG. 3B, as second fan cowl panel 104b is rotated in the radially inward direction of arrow 164, first and second legs 142a, 142b translate over head 180 of stud 144. The slope of head 180 between its widest point 184 and distal end 186 and the slope of mouth 170 may facilitate the translation of first and second legs 142a, 142b over head 180. As first and second legs 142a, 142b translate along head 180, width W1 increases. Stated differently, as first and second legs 142a, 142b translate over head 180, an axial distance between the distal portions 168 of first and second legs 142a, 142b increases.

Referring to FIG. 3C, as proximal end 173 of mouth 170 translates radially inward of the widest point 184 of head 180, width W1 decreases. In this regard, first and second legs 142a, 142b comprise an elasticity that causes the width W1 to decrease as first and second legs 142a, 142b translate radially inward of head 180. With combined reference to FIG. 3A and FIG. 3C, in various embodiments, the width W4 of stem 182 may be greater than the width W1 of receptacle 142 at elastic equilibrium (FIG. 3A) and/or the width W3 of head 180 may be greater than width W2 of receptacle 142 at elastic equilibrium (FIG. 3A). In this regard, when second fan cowl panel 104b is in the closed position (FIG. 3C), the elasticity of first and second legs 142a, 142b may cause first and second legs 142a, 142b to clamp or apply a force against stud 144, such that a sealing interface is formed between receptacle 142 and stud 144. When receptacle 142 engages stud 144, the varying axial width of receptacle 142 and stud 144 may prevent or reduce radially outward movement of second fan cowl panel 104b and/o may block or reduce external airflow into internal compartment 160.

Figure 4B:
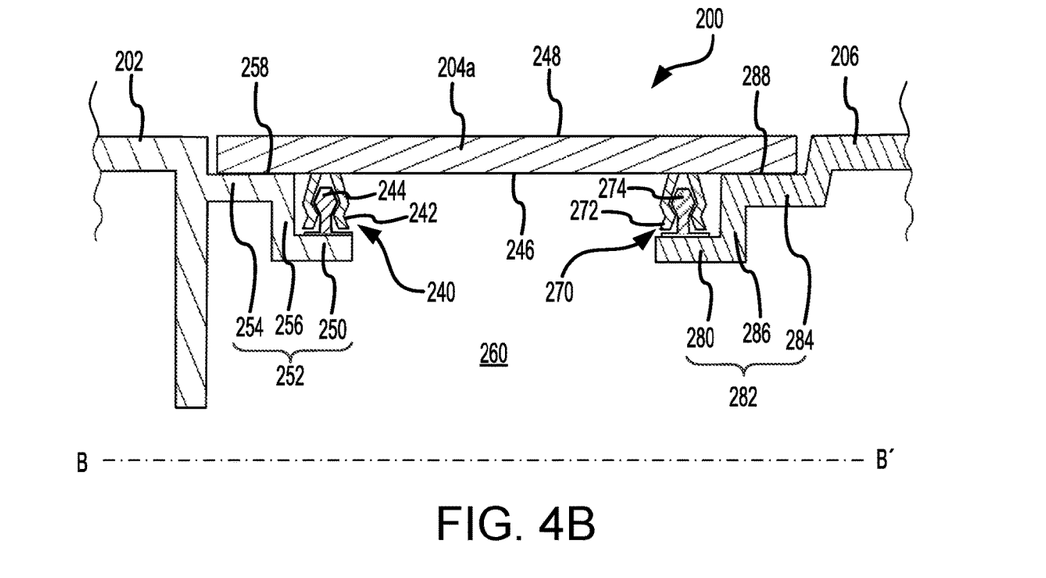

Referring now to FIGS. 4A and 4B, a nacelle 200, similar to nacelle 100 in FIGS. 1A and 1B is illustrated, in accordance with various embodiments. Nacelle 200 includes an inlet 202, a fan cowl 204, and a thrust reverser 206. Fan cowl 204 may include one or more a hinged fan cowl panel(s) 204a (similar to first and second fan cowl panels 104a, 104b in FIG. 1B), such that fan cowl panel 204a can pivot, or rotate, between an open position and a closed position. A first securement retainer 240, similar to securement retainer 140 in FIGS. 2A and 2B, may be coupled between fan cowl panel 204a and inlet 202. A second securement retainer 270, similar to securement retainer 140 in FIGS. 2A and 2B, may be coupled between fan cowl panel 204a and thrust reverser 206.

First securement retainer 240 includes a receptacle (or first portion) 242 coupled to an interior surface 246 of fan cowl panel 204a, and a stud (or second portion) 244 coupled to a forward retainer land 250 of inlet 202. Receptacle 242 is configured to receive and engage stud 244. Receptacle 142 extends radially inward from interior surface 246 of fan cowl panel 204a. In various embodiments, receptacle 242 may be formed extending between opposing circumferential ends of fan cowl panel 204a. In various embodiments, forward retainer land 250 may comprise a radially inward portion of an aft inlet flange 252 of inlet 202. Aft inlet flange 252 may include forward retainer land 250, a fan cowl interface portion 254, and a connection portion 256, similar to aft inlet flange 152 in FIG. 2B.

Second securement retainer 270 includes a second receptacle 272 and a second stud 274. Second receptacle 272 is configured to receive and engage second stud 274. In various embodiments, second receptacle 272 may be coupled to interior surface 246 of fan cowl panel 204a. Interior surface 246 of fan cowl panel 204a is opposite an exterior surface 248 of fan cowl panel 204a. Second receptacle 272 extends radially inward from interior surface 246. In various embodiments, second receptacle 272 may be formed extending between opposing circumferential ends of fan cowl panel 204a.

Second stud 274 may be coupled to an aft retainer land 280 of thrust reverser 206. Second stud 274 of second securement retainer 270 extends radially outward from aft retainer land 280. In various embodiments, second stud 274 may be formed extending around a circumference of thrust reverser 206. For example, second stud 274 may extend between 320° and 360° about a central longitudinal axis B-B' of nacelle 200. Aft retainer land 280 may comprise a radially inward portion of a forward thrust reverser flange 282 of thrust reverser 206. Forward thrust reverser flange 282 may include aft retainer land 280, an aft fan cowl interface portion 284, and an aft connection portion 286 extending radially between aft fan cowl interface portion 284 and aft retainer land 280. Aft fan cowl interface portion 284 and aft retainer land 280 may extend in a generally axial direction. In various embodiments, aft retainer land 280 may be located forward of aft fan cowl interface portion 284. Aft connection portion 286 may extend in a generally radial direction. When fan cowl panel 204a is in the closed position, interior surface 246 of fan cowl panel 204a may contact and/or apply a radially inward force against a radially outward surface 258 of fan cowl interface portion 254 of aft inlet flange 252 and against a radially outward surface 288 of aft fan cowl interface portion 284 of forward thrust reverser flange 282. While receptacles 242, 272 are illustrated as coupled to fan cowl panel 204a, it is further contemplated and understood that studs 244, 274 may be coupled to fan cowl panel 204a and receptacles 242, 272 may be coupled to aft inlet flange 252 and forward thrust reverser flange 282, respectively, similar to securement retainer 440 in FIG. 6.

The engagement between receptacle 242 and stud 244 of first securement retainer 240 and between second receptacle 272 and second stud 274 of second securement retainer 270 may prevent or reduce radially outward translation of fan cowl panel 204a, thereby helping to maintain a sealing interface between interior surface 246 and radially outward surfaces 258 and 288. Additionally, the engagement between receptacle 242 and stud 244 of first securement retainer 240 and between second receptacle 272 and second stud 274 of second securement retainer 270 may block or reduce external airflow from entering an internal compartment 260 of nacelle 200.

Figure 5A:
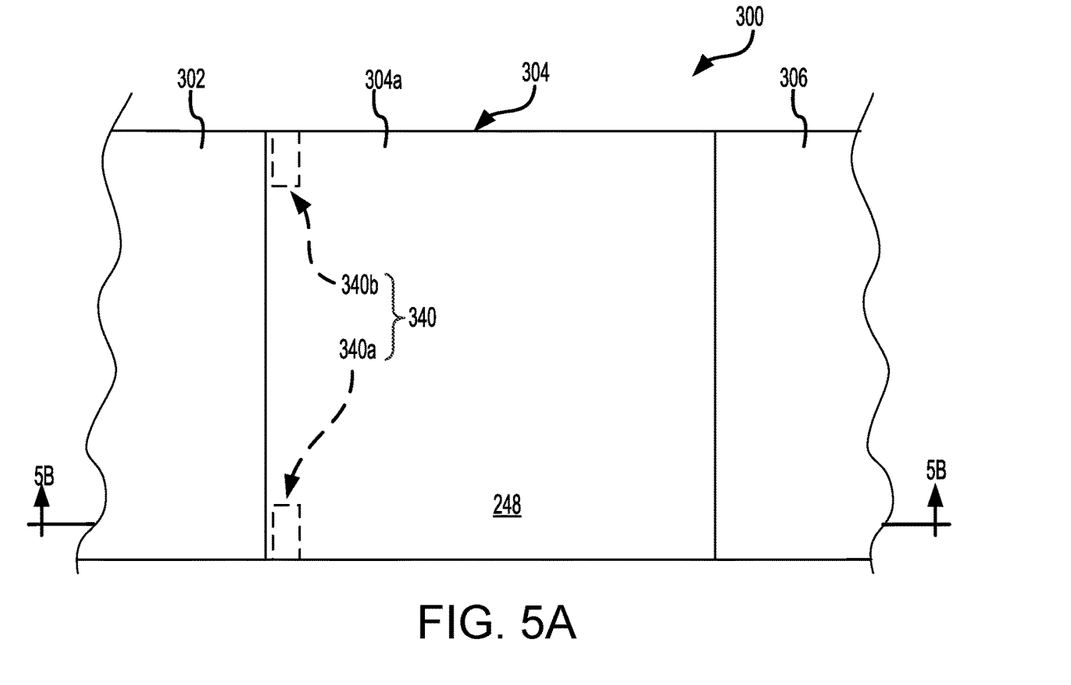
FIGS. 5A and 5B illustrate, respectively, a partial side view and a cross-section view, taken along the line 5B-5B in FIG. 5A, of a nacelle with a securement retainer coupled between the fan cowl and the inlet and located forward of the interface flange of inlet, in accordance with various embodiments.
Figure 5B:
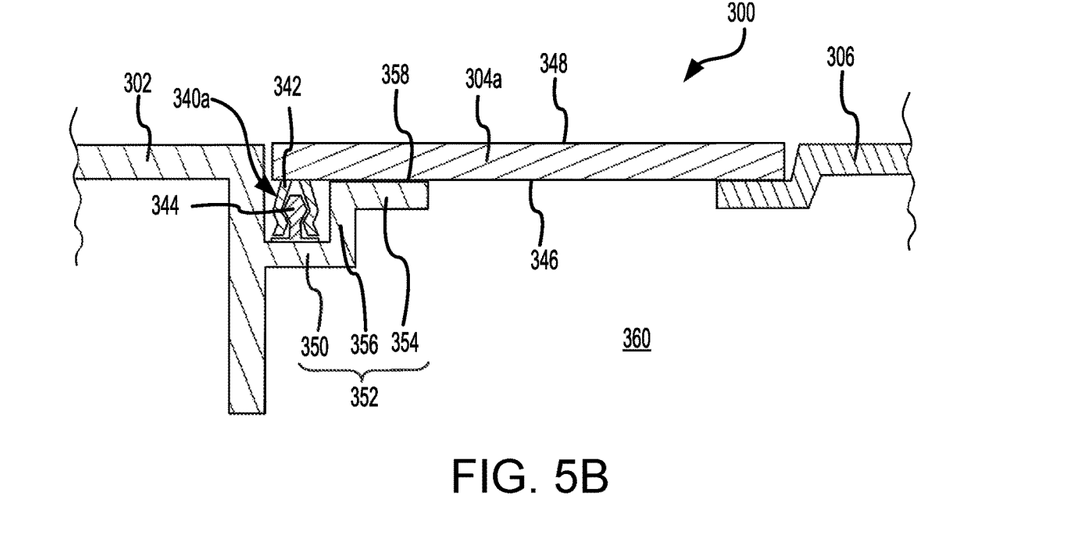
Figure 5C:
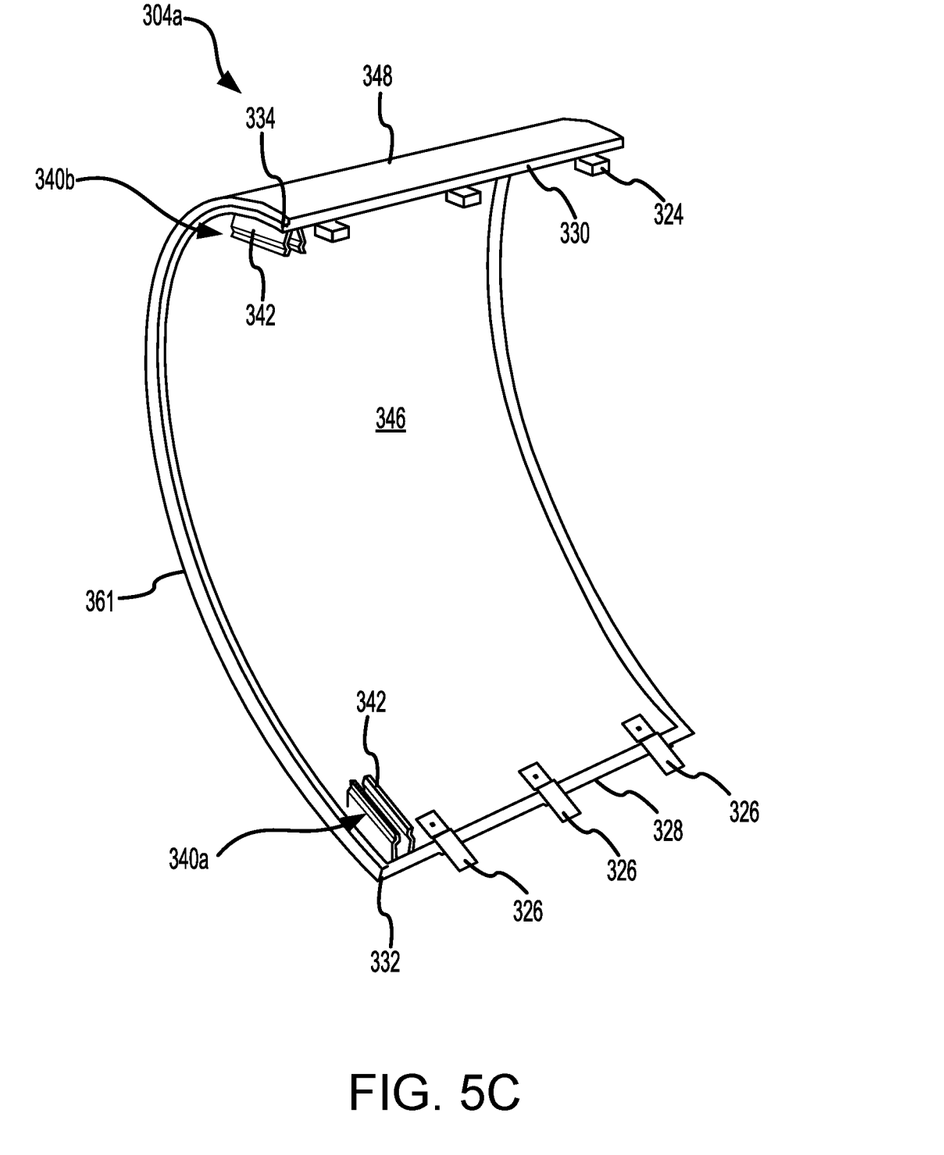
FIG. 5C illustrates a fan cowl half with securement retainer receptacles located proximate the forward corners of the fan cowl half, in accordance with various embodiments.

Referring now to FIGS. 5A and 5B, a nacelle 300, similar to nacelle 100 in FIGS. 1A and 1B is illustrated, in accordance with various embodiments. Nacelle 300 includes an inlet 302, a fan cowl 304, and a thrust reverser 306. Fan cowl 304 may include one or more a hinged fan cowl panel(s) 304a (similar to first and second fan cowl panels 104a, 104b in FIG. 1B), such that fan cowl panel(s) 304a can pivot, or rotate, between an open position and a closed position. A plurality of securement retainers 340, for example, first securement retainer 340a and second securement retainer 340b, may be coupled between fan cowl panel 304a and inlet 302. Securement retainers 340 each include a receptacle (or first portion) 342 and a stud (or second portion) 344. In various embodiments, securement retainers 340 may be located proximate the circumferential ends of fan cowl panel 304a. For example, and with reference to FIG. 5C, fan cowl panel 304a may include one or more latches 326 located at a first circumferential end 328 of fan cowl panel 304a, and one or more hinge joints located at an opposing second circumferential end 230 of fan cowl panel 304a. First securement retainer 340a may be located proximate a first forward corner 332 of fan cowl panel 304a. First forward corner 332 is formed by the first circumferential end 328 and a forward edge 361 of fan cowl panel 304a. Second securement retainer 340b may be located proximate a second forward corner 334 of fan cowl panel 304a that is circumferentially opposite first forward corner 332. Second forward corner 334 is formed by the second circumferential end 330 and forward edge 361 of fan cowl panel 304a.

Returning to FIGS. 5A and 5B, receptacles 342 of first and second securements retainers 340a, 340b may each be coupled to an interior surface 346 of fan cowl panel 304a. Receptacles 342 extend radially inward from interior surface 346 of fan cowl panel 304a. Receptacles 342 are configured to receive and engage studs 344.

Studs 344 of first and second securements retainers 340a, 340b may each be coupled to a retainer land 350 of inlet 302. Retainer land 350 may comprise a radially inward portion of an aft inlet flange 352 of inlet 302. Aft inlet flange 352 may include retainer land 350, a fan cowl interface portion 354, and a connection portion 356 extending radially between fan cowl interface portion 354 and retainer land 350. Fan cowl interface portion 354 and retainer land 350 may extend in a generally axial direction. In various embodiments, retainer land 350 may be located forward of fan cowl interface portion 354. In this regard, securement retainers 340 may be located aft the interface between interior surface 346 and a radially outward surface 358 of fan cowl interface portion 354. While receptacle 442 and stud 444 are illustrated as coupled to fan cowl panel 304a and aft inlet flange 352, respectively, it is further contemplated and understood that receptacles 342 may be coupled to aft inlet flange 352 and studs 344 may be coupled to fan cowl panel 304a, similar to securement retainer 440 in FIG. 6.

The engagement between receptacles 342 and studs 344 of securement retainers 340 may prevent or reduce radially outward translation of fan cowl panel 304a, thereby helping to maintain a sealing interface between interior surface 346 and radially outward surface 258. Additionally, the engagement between receptacles 342 and studs 344 may block or reduce external airflow from entering an internal compartment 360 of nacelle 300.

Figure 6:
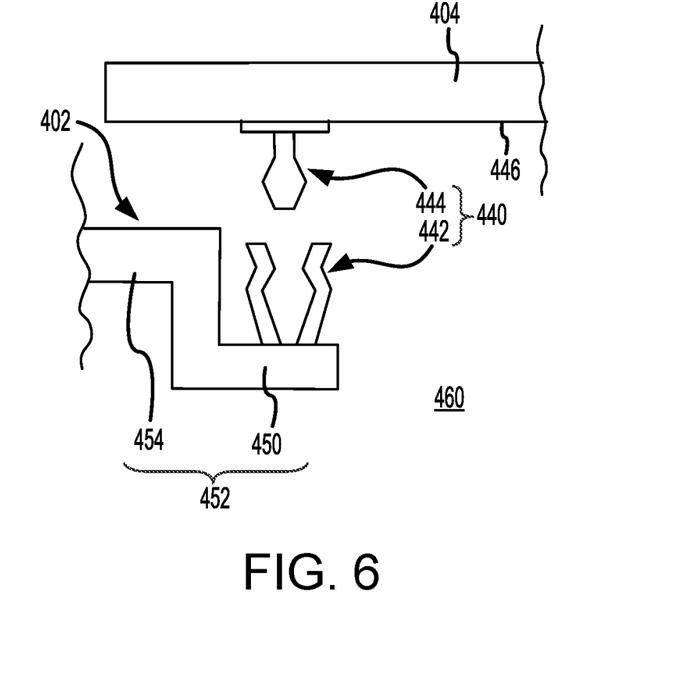
FIG. 6 illustrates a securement retainer receptacle attached to an inlet and a securement retainer stud attached to a fan cowl, in accordance with various embodiments.

Referring to FIG. 6, a securement retainer 440 is illustrated, in accordance with various embodiments. Securement retainer 440 includes a receptacle (or first portion) 442 and a stud (or second portion) 444. Stud 444 may be coupled to an interior surface 446 of a hingedly coupled fan cowl panel 404, similar to hingedly coupled first and second fan cowl panels 104a, 104b in FIG. 2A. Stud 444 extends radially inward from interior surface 446 of fan cowl panel 404. Stud 444 is configured to be received by receptacle 442. Stated differently, receptacle 442 is configured to receive and engage stud 444. Receptacle 442 is coupled to a retainer land 450 of an inlet 402, similar to retainer land 150 and inlet 102 in FIGS. 1B and 2B. Retainer land 450 may comprise a radially inward portion of an aft inlet flange 452 of inlet 402. Aft inlet flange 452 may include a fan cowl interface portion 454. In various embodiments, retainer land 450 may be located aft of fan cowl interface portion 454. In various embodiments, retainer land 450 may be located forward of fan cowl interface portion 454, similar to retainer land 350 in FIG. 5B.

Engagement between receptacle 442 and stud 444 may prevent or reduce radially outward translation of fan cowl panel 404, thereby helping to maintain a sealing interface between interior surface 446 and fan cowl interface portion 454. Additionally, the engagement between receptacle 442 and stud 444 may block or reduce external airflow from entering an internal compartment 460.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nacelle, comprising:
   an inlet including an aft inlet flange located at an aft end of the inlet, the aft inlet flange comprising:
   a fan cowl interface portion;
   a connection portion extending radially inward from the fan cowl interface portion; and
   a retainer land radially inward of the fan cowl interface portion and extending axially from the connection portion;
   a fan cowl aft of the inlet, the fan cowl including a fan cowl panel configured to rotate between an open position and a closed position, wherein a first radially outward surface of the fan cowl interface portion of the aft inlet flange is configured to contact an interior surface of the fan cowl panel when the fan cowl panel is in the closed position; and
   a first securement retainer including a first receptacle coupled to the interior surface of the fan cowl panel and a first stud coupled to a second radially outward surface of the retainer land of the aft inlet flange, the second radially outward surface of the retainer land being oriented toward the interior surface of the fan cowl panel,
   wherein the first receptacle of the first securement retainer extends radially inward from the interior surface of the fan cowl panel and the first stud of the first securement retainer extends radially outward from the second radially outward surface of the retainer land,
   wherein the first receptacle is configured to receive and engage the first stud,
   wherein engagement between the first receptacle and the first stud is configured to reduce radially outward movement of the fan cowl panel,
   wherein the first receptacle defines a channel, a distal portion of the first receptacle defining a mouth of the channel and a proximal portion of the first receptacle defining a central portion of the channel, the central portion of the channel extending from a proximal end of the mouth to the interior surface of the fan cowl panel,
   wherein a width of the mouth increases in a radially inward direction, and
   wherein a width of the central portion decreases in the radially inward direction between a widest point of the central portion and the proximal end of the mouth.

2. The nacelle of claim 1, wherein the retainer land and the first stud of the first securement retainer are located forward of the fan cowl interface portion.

3. The nacelle of claim 1, wherein the retainer land and the first stud of the first securement retainer are located aft of the fan cowl interface portion.

4. The nacelle of claim 1, further comprising:
   a thrust reverser aft of the fan cowl; and
   a second securement retainer including a second receptacle coupled to the interior surface of the fan cowl panel and a second stud coupled to a forward thrust reverser flange of the thrust reverser.

5. The nacelle of claim 1, wherein the width of the central portion of the channel decreases in a radially outward direction between the widest point of the central portion and the interior surface of the fan cowl panel, and wherein the first stud includes a head and a stem extending radially inward from the head, and wherein a width of the head decreases in the radially inward direction between a widest point of the head and the stem and in the radially outward direction between the widest point of the head and a distal end of the head opposite the stem.

6. The nacelle of claim 1, wherein the first receptacle of the first securement retainer extends from a first circumferential end of the fan cowl panel to a second circumferential end of the fan cowl panel opposite the first circumferential end.

7. The nacelle of claim 1, further comprising a second securement retainer including at least one of a second receptacle or a second stud coupled to the interior surface of the fan cowl panel, wherein the first receptacle of the first securement retainer is located proximate a first forward corner of the fan cowl panel, and wherein the at least one of the second receptacle or the second stud of the second securement retainer is located proximate a second forward corner of the fan cowl panel circumferentially opposite the first forward corner.

8. A propulsion system, comprising:
a gas turbine engine; and
a nacelle radially outward of the gas turbine engine, the nacelle comprising:
an inlet including an aft inlet flange located at an aft end of the inlet, the aft inlet flange comprising:
a fan cowl interface portion;
a connection portion extending radially inward from the fan cowl interface portion; and
a retainer land radially inward of the fan cowl interface portion and extending axially from the connection portion;
a fan cowl aft of the inlet, the fan cowl including a fan cowl panel configured to rotate between an open position and a closed position, wherein a first radially outward surface of the fan cowl interface portion of the aft inlet flange is configured to contact an interior surface of the fan cowl panel when the fan cowl panel is in the closed position; and
a first securement retainer including a first receptacle coupled to the interior surface of the fan cowl panel and a first stud coupled to a second radially outward surface of the retainer land of the aft inlet flange, the second radially outward surface of the retainer land being oriented toward the interior surface of the fan cowl panel,
wherein the first receptacle of the first securement retainer extends radially inward from the interior surface of the fan cowl panel and the first stud of the first securement retainer extends radially outward from the second radially outward surface of the retainer land,
wherein the first receptacle is configured to receive and engage the first stud,
wherein engagement between the first receptacle and the first stud is configured to reduce radially outward movement of the fan cowl panel,
wherein the first receptacle defines a channel, a distal portion of the first receptacle defining a mouth of the channel and a proximal portion of the first receptacle defining a central portion of the channel, the central portion of the channel extending from a proximal end of the mouth to the interior surface of the fan cowl panel,
wherein a width of the mouth increases in a radially inward direction, and
wherein a width of the central portion decreases in the radially inward direction between a widest point of the central portion and the proximal end of the mouth.

9. The propulsion system of claim 8, wherein the width of the central portion of the channel increases in the radially inward direction between the interior surface of the fan cowl panel and the widest point of the central portion.

10. The propulsion system of claim 9, wherein the first receptacle comprises a pair of legs, and wherein the pair of legs defines the central portion of the channel.

11. The propulsion system of claim 10, wherein the pair of legs defines the mouth of the channel.

12. The propulsion system of claim 8, wherein the first receptacle of the first securement retainer extends from a first circumferential end of the fan cowl panel to a second circumferential end of the fan cowl panel opposite the first circumferential end.

13. The propulsion system of claim 8, wherein the nacelle further comprises a second securement retainer including at least one of a second receptacle or a second stud coupled to the interior surface of the fan cowl panel, and wherein the first receptacle of the first securement retainer is located proximate a first forward corner of the fan cowl panel, and wherein the at least one of the second receptacle or the second stud of the second securement retainer is located proximate a second forward corner of the fan cowl panel circumferentially opposite the first forward corner.

\* \* \* \* \*